United States Patent [19]

Miller et al.

[11] Patent Number: 4,848,391
[45] Date of Patent: Jul. 18, 1989

[54] EXPANDABLE MANIFOLD FOR WATER DELIVERY SYSTEM

[75] Inventors: Leonard L. Miller; W. Keith Swinehart, both of McPherson, Kans.

[73] Assignee: Midtec, Inc. of America, McPherson, Kans.

[21] Appl. No.: 219,448

[22] Filed: Jul. 12, 1988

[51] Int. Cl.[4] ............................................. F16K 27/00
[52] U.S. Cl. .................................... 137/270; 137/884
[58] Field of Search ........................ 137/269, 270, 884

[56] References Cited

U.S. PATENT DOCUMENTS

| | | | |
|---|---|---|---|
| 3,234,963 | 2/1966 | Lyon | 137/884 |
| 3,563,265 | 2/1971 | Graham | 137/269 |
| 4,306,587 | 12/1981 | Tchebinyayeff | 137/884 X |

FOREIGN PATENT DOCUMENTS

| | | | |
|---|---|---|---|
| 920912 | 2/1973 | Canada | 137/269 |
| 052717 | 9/1981 | European Pat. Off. | 137/884 |

OTHER PUBLICATIONS

Brochure "Vanguard Superflow Manifold Plumbing Systems", pp. 1-2.

*Primary Examiner*—John Fox
*Attorney, Agent, or Firm*—Kokjer, Kircher, Bradley, Wharton, Bowman & Johnson

[57] ABSTRACT

A fluid delivery manifold especially designed for water systems in buildings and residences is the subject of this invention. The manifold is formed from a plurality of identically configured fittings provided with male and female ends so that like fittings may be frictionally joined without the need for thermal welding. Retaining rods extend the length of a gang of joined fittings and are designed to provide compressive forces to maintain the fittings in sealing relationship. The fittings are joined together in pairs which make an integral unit so that side-by-side hot and cold water manifolds may be presented in one assembly operation. The juncture between the integral pair of fittings is, however, designed to present a line of weakness so that the two fittings may be separated if desired. Each fitting has three equal flat elongated surfaces which are disposed at 90° relative to each other so that fittings may be joined in three different rotational positions.

8 Claims, 2 Drawing Sheets

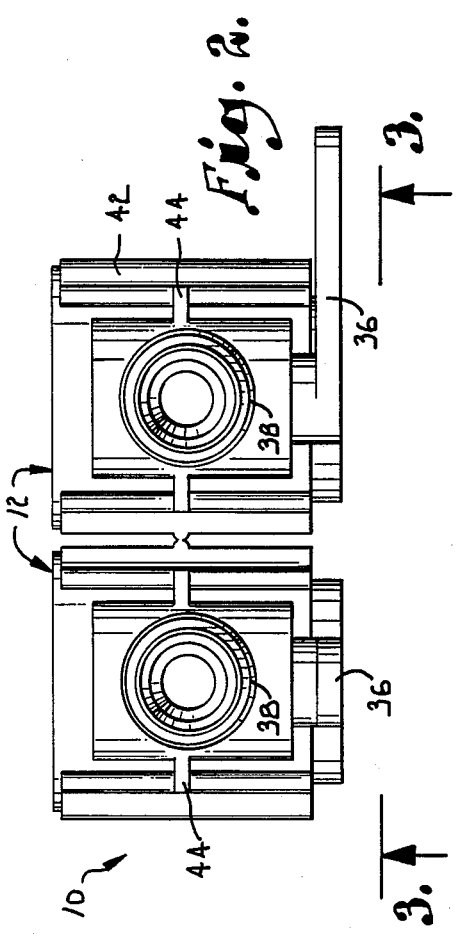
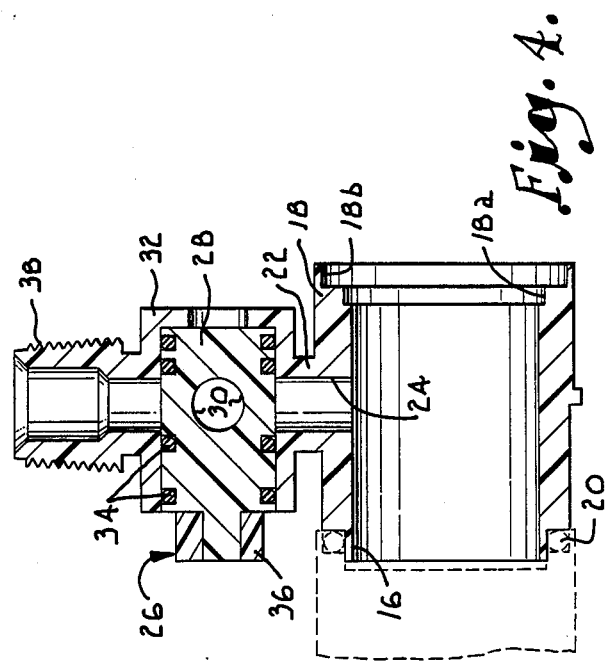
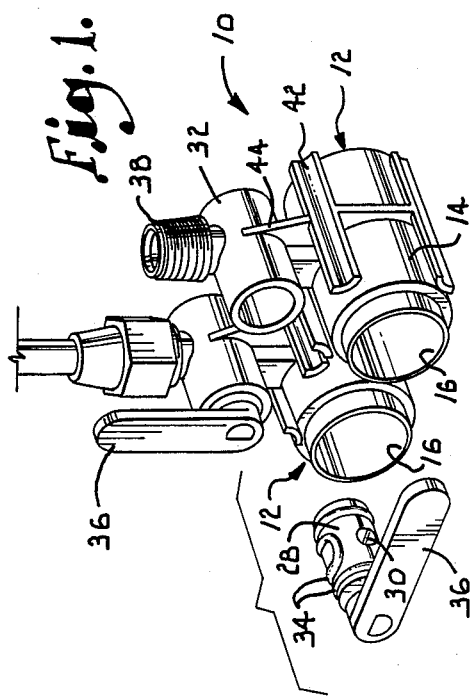
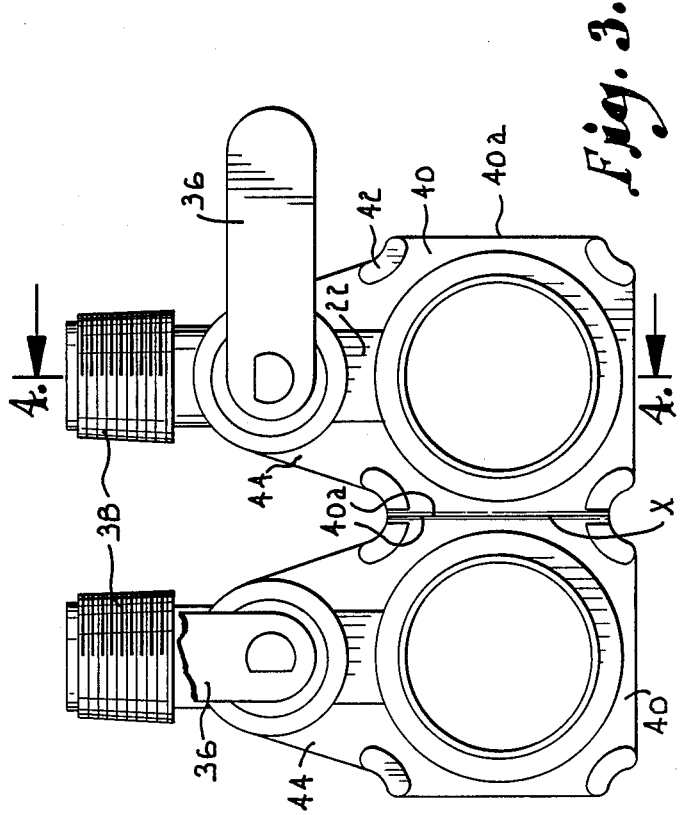

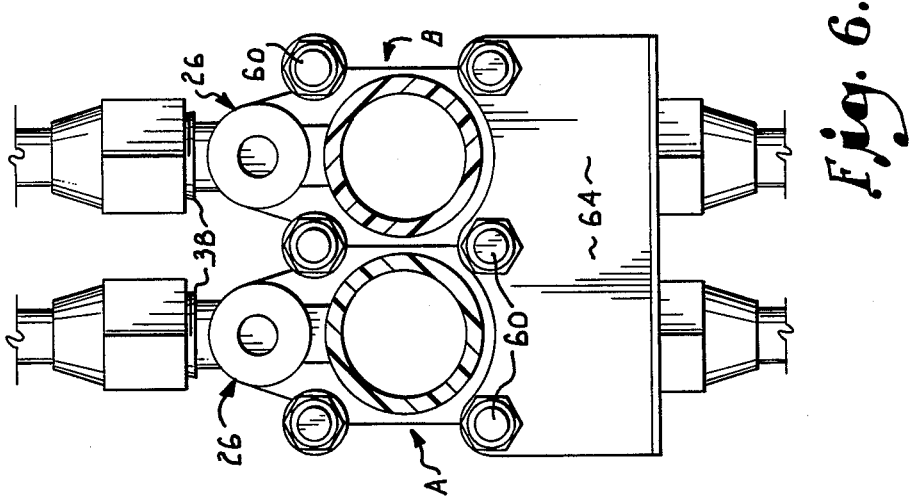
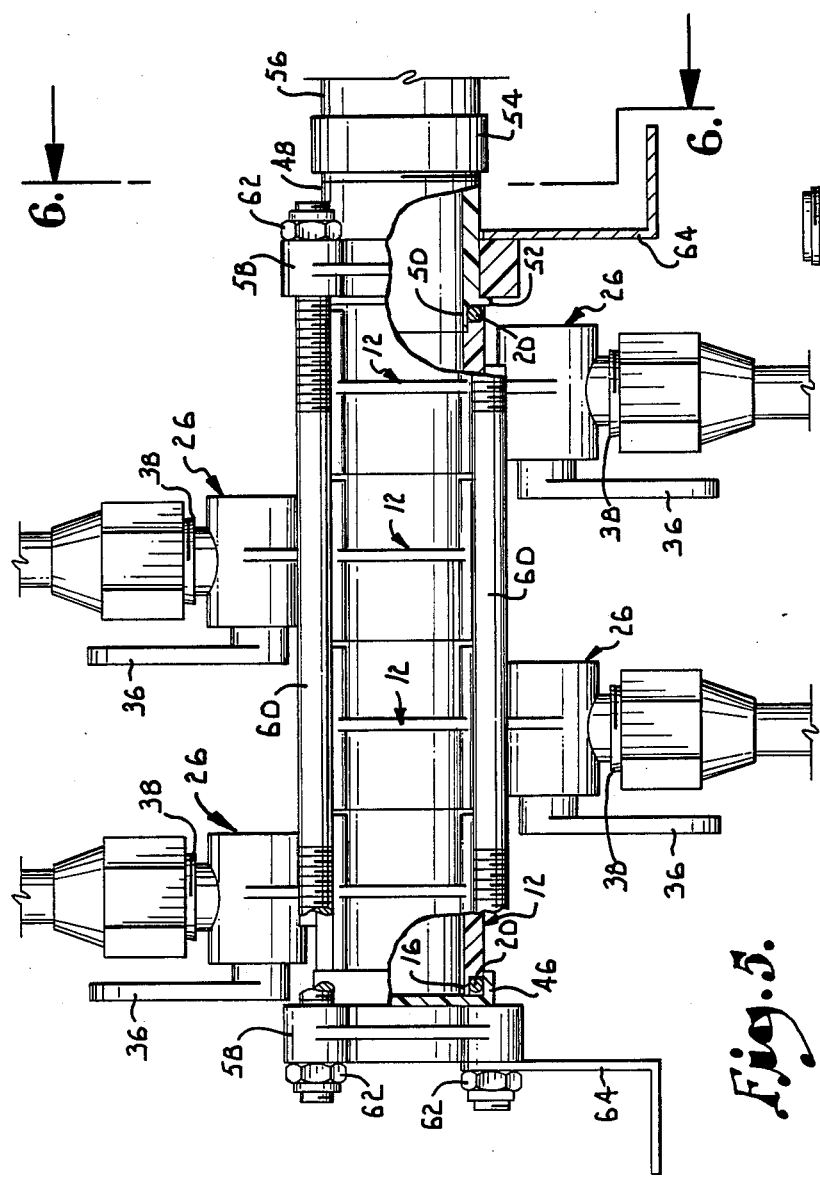
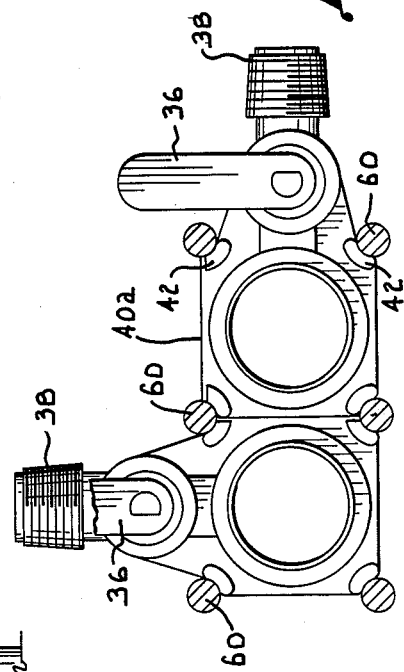

EXPANDABLE MANIFOLD FOR WATER DELIVERY SYSTEM

This invention relates generally to fluid delivery systems and, more particularly, to a manifold for use in conjunction with a fluid delivery system.

In residential and commercial plumbing installations it is known to utilize a water delivery manifold from which lines are plumbed to fixtures requiring water in a structure. In recent years, manifolds of this type have been constructed from plastic and plastic lines have been utilized for water delivery. The advantages of a manifold water delivery system include reduced noise, lower energy requirements for water heating, increased safety from scalding caused by water pressure loss, and the ability to deliver water at a higher velocity without eroding the delivery line.

The manifold systems which have heretofore been utilized have required that the components be thermal welded so as to make a manifold of the desired size. It has also been the practice, heretofore, to construct two separate manifolds for the hot and cold water utilizing a plurality of identically configured components each having the capacity to handle a single line extending from the manifold in conjunction with appropriate valve means. The existence of two manifolds for each hot and cold water system requires duplication of mounting brackets and labor for installation.

It is a primary object of the present invention to provide a fluid delivery manifold which is constructed from a plurality of identical fittings that form a fluid tight seal without the requirement of thermal welding.

Another important objective of our invention is to provide a fluid delivery manifold wherein each fitting comprises a tubular housing which presents two side-by-side hollow tubular interiors so that two manifolds can be formed by combining a number of such fittings and a single mounting bracket utilized for both manifolds.

As a corollary to the above objects, an important aim of the invention is to provide a fitting for use in constructing a fluid delivery manifold wherein the manifold may be made in various lengths by putting any number of manifolds in end-to-end relationship.

Another one of the objects of our invention is to provide a fluid delivery manifold which is made up of a plurality of fittings presenting side-by-side hollow tubular interiors and wherein a line of weakness characterizes the area between the two tubular interiors so that the fitting may be broken in half and utilized as a single tube fitting if needed.

Still another one of the objects of the invention is to provide a fluid delivery system of the type described in the foregoing objects wherein lines may extend away from the manifold in different directions.

Other objects of the invention will be made clear or become apparent from the following description and claims wherein:

FIG. 1 is a perspective view of a fitting of the type utilized in constructing a manifold according to the present invention;

FIG. 2 is an enlarged top plan view of a fitting of the type utilized in constructing a manifold according to the present invention;

FIG. 3 is a side elevational view looking in the direction of arrows 3—3 of FIG. 2;

FIG. 4 is a vertical cross-sectional view taken along line 4—4 of FIG. 3;

FIG. 5 is a top plan view with portions broken away and shown in cross section of a manifold constructed according to the present invention utilizing the fittings shown in the foregoing FIGS;

FIG. 6 is a vertical cross-sectional view taken along line 6—6 of FIG. 5; and

FIG. 7 is a vertical cross-sectional view taken through the manifold and illustrating an alternative spatial arrangement of two individual fitting components.

Referring initially to FIG. 1, a manifold is designated generally by the numeral 10 and comprises two integral side-by-side housing fittings each of which is designated by the numeral 12. The two integrally joined fittings present a unit which may be interconnected with other like units. Each housing fitting includes an elongated tubular member 14 having a hollow interior and characterized by a fluid conducting male end 16 at one end and a fluid conducting female end 18 opposite the end 16. Female end 18 has a first stepped surface 18a which is adapted to receive male end 16 in tight frictional engagement and a second stepped surface 18b which is adapted to receive an O-ring 20 also in tight frictional engagement.

Each fitting 12 also includes a stem housing 22 extending at a right angle to tubular member 14 and presenting a fluid delivery conduit 24 which is in communication with the interior of member 14. A cutoff valve 26 is disposed in conduit 24 and includes a movable valve body 28 which presents a fluid passage 30, a housing 32 surrounding the valve body, O-ring seals 34 disposed partially between body 28 and housing 32, and finally, a handle 36 which is operable to rotate valve body 28 between fluid passage and fluid blocking positions. The fluid delivery conduit 24 terminates in a threaded nipple 38 for coupling a delivery line with the fitting.

The exterior of tubular member 14 is characterized by integral flanges 40 which present flat surfaces 40a extending along three sides of member 14. Each of surfaces 40a is of the same length and is characterized at both ends by a curvilinear corner surface 42. An additional side flange 44 extends away from member 14 towards valve 26 where it merges into and is integral with valve housing 32. The two adjacent flange surfaces 40a of the two side-by-side housings 12 are integrally joined in a manner so as to present a line of weakness "X" at a point where the two surfaces meet.

A plurality of the units comprised of a pair of side-by-side fittings 12 can be fitted together in a gang, such as illustrated in FIG. 5, so as to present side-by-side manifolds A and B. This is done by inserting male ends 16 into female ends 18 and forcing the two into engagement with O-ring 20 completing a fluid tight seal as it is sandwiched between opposing surfaces of the two ends. It is to be noted in FIGS. 5 and 6 that the first unit of integral fittings 12 (from left to right) is oriented with valves 26 projecting upwardly followed by another unit of fittings 12 having valves 26 disposed downwardly, then another unit with the valves projecting upwardly followed by a final pair with valves 26 projecting downwardly.

The male end 16 of one fitting 12 at the far left in FIG. 5 is closed by a cap 46 which is received by the male end with a fluid tight seal being perfected by an additional O-ring 20. At the opposite end of the assembled gang of fittings 12 is an end coupler fitting 48 having a male end 50 which is received by the female end of a fitting 12 at the far right-hand end of the gang of fittings shown in FIG. 5. Again, an O-ring 20 assures a fluid tight seal. A flange 52 on fitting 48 is utilized for transferring compression forces along the length of the manifold as will be more fully explained hereinafter. Fitting 48 is provided with a threaded end opposite male end 50 so as to receive a threaded collar 54 which secures a supply line 56 to manifold B.

In order to ensure the fluid tight integrity of manifolds A and B during use, means is provided for continuously applying compression forces in opposite directions along the length of fittings 12. This is done through end plates 58 each of which has two side-by-side openings for receiving two end couplers 48 if desired. Each end plate 58 is also provided with six openings for receiving retaining rods 60 which extend along the length of the manifolds and pass through aligned openings in the opposite end plate 58. Rods 60 rest on the surface 42 of each fitting 12. As shown, rods 60 are threaded at both ends and thus receive threaded nuts 62. When nuts 62 are tightened, compression forces will be exerted in opposite directions toward the center of the manifold to assure that fittings 12 will maintain a fluid tight seal. In this regard, in the case of the left-hand end of manifold A in FIG. 5, forces applied through the nuts 62 will be transferred through end plate 58 to end cap 46 and then through the remainder of the manifold. In the case of the right-hand end of the manifold, when viewing FIG. 5, tightening of nuts 62 transfers compression forces through end plate 58 as a result of flange 52 presenting a stop for the plate. These forces are then transferred via flange 52 to the remaining fittings 12.

L-shaped brackets 64 are provided for mounting the manifolds against a flat surface or other support. Three openings in brackets 64 are aligned with the openings in end plates 58 so that rods 60 may be passed through the brackets and nuts 62 secured outside of the brackets thereby coupling the brackets to the manifolds in rigid relationship. Other openings (not shown) in the other leg of the L-shaped bracket provide means for securing additional fasteners so as to couple the bracket with the supporting surface.

As previously mentioned, a line of weakness "X" is presented at the juncture between two adjacent flat surfaces 40a of fittings 12. This permits the two housings to be broken apart by the application of relatively small forces in opposite directions along the line of weakness. This results in two unattached fittings 12 which may be used individually to form a single tube manifold or a branch from one of the manifolds A and B formed by a gang of housings 12. This latter arrangement is illustrated in FIG. 7 where two housing sections 12 have been separated and the one housing section on the right turned 90° relative to the other housing. Because of the symmetry of the housings with three of the sides presenting identical flat surfaces 40a with curvilinear surfaces 42, plurality of the fittings 12 may be joined together in up to three different rotational orientations (90°, 180°, 270° relative to stem housing 22) without requiring any modifications of the bracket and rod assembly which holds the fittings together.

We claim:

1. A manifold for use in conjunction with a fluid delivery system, said manifold comprising:

a plurality of tubular fittings each presenting a hollow interior and being characterized by a fluid conducting male end and a fluid conducting female end, said male end of one fitting being adapted to be inserted into the female end of an adjacent fitting, each of said fittings presenting three flat exterior equal length surfaces disposed at right angles to one another whereby each of said fittings may be joined to another fitting in a plurality of different rotational positions;

means for providing a fluid tight seal between joined ends of said fittings;

valve means coupled with said fitting between said ends and in fluid communication with said interior;

bracket means adapted to be disposed in spaced relationship at opposite ends of a plurality of joined fittings for mounting said fittings on a flat surface; and tensioning means extending along said fittings for exerting forces in opposite directions which act to maintain said fitting ends in fluid sealing relationship;

wherein each of said fittings is characterized by a curvilinear surface extending along the side of the fitting at each corner, and wherein said tensioning means comprises first and second end plates adapted to be disposed at opposite ends of a gang of joined fittings, rod means disposed along at least two sides of said fittings, said rod means externally resting on said curvilinear surfaces and passing through said end plates, and means for exerting opposed forces on said end plates through said rod means.

2. A manifold as set forth in claim 1, wherein one end of one of said fittings is adapted to be coupled with a supply line and one end of another of said fittings is adapted to be coupled with an end plate.

3. A manifold as set forth in claim 1, wherein two of said fittings are joined together side by side to present an integral unit and said manifold is presented by a plurality of interconnected units.

4. A manifold as set forth in claim 3, wherein the surfaces of adjacent fittings which present said unit are integrally joined in a manner to present a line of weakness.

5. A device to be used in constructing a fluid manifold, said device comprising:

a pair of tubular fittings joined together side by side to present an integral unit, each said fitting having three flat exterior equal length surfaces and presenting a hollow interior and being further characterized by a fluid conducting male end and a fluid conducting female end, said female end being adapted to receive in locking relationship the male end of another like configured fitting;

means on each fitting coupled with one of said male end and said female end for presenting a resilient fluid tight seal when joined with the opposite end of another like configured fitting;

valve means coupled with said fitting on a fourth side of the latter between said ends and in fluid communication with said hollow interior and a curvilinear surface extending along each side at each corner.

6. A device as set forth in claim 5, wherein the juncture between said two fittings presenting said unit is characterized by a line of structural weakness whereby when opposing forces are applied to said unit said two fittings may be separated.

7. A manifold for use in conjunction with a fluid delivery system, said manifold comprising:

a plurality of tubular fittings each presenting a hollow interior and being characterized by a fluid conducting male end and a fluid conducting female end, said male end of one fitting being adapted to be inserted into the female end of an adjacent fitting;

means for providing a fluid tight seal between joined ends of said fittings;

valve means coupled with said fitting between said ends and in fluid communication with said interior;

bracket means adapted to be disposed in spaced relationship at opposite ends of a plurality of joined fittings for mounting said fittings on a flat surface; and tensioning means extending along said fittings for exerting forces in opposite directions which act to maintain said fitting ends in fluid sealing relationship;

wherein two of said fittings are joined together side by side to present an integral unit and said manifold is presented by a plurality of interconnected units, and wherein each of said fittings presents three flat exterior equal length surfaces disposed at right angles to one another with the surfaces of adjacent fittings which present said unit being integrally joined in a manner to present a line of weakness.

8. A device to be used in constructing a fluid manifold, said device comprising:

a fitting having three flat exterior equal length surfaces and presenting a hollow interior and being further characterized by a fluid conducting male end and a fluid conducting female end, said female end being adapted to receive in locking relationships the male end of another like configured fitting;

means coupled with one of said male end and said female end for presenting a resilient fluid tight seal when joined with the opposite end of another like configured fitting; and valve means coupled with said fitting on a fourth side of the latter between said ends and in fluid communication with said hollow interior, wherein two of said fittings are joined together side by side to present an integral unit; and wherein the juncture between said two fittings presenting said unit is characterized by a line of structural weakness whereby when opposing forces are applied to said unit said two fittings may be separated.

* * * * *